Feb. 24, 1942.    F. FISCHER    2,274,443
RATE OF TURN GYROSCOPE
Filed July 1, 1939
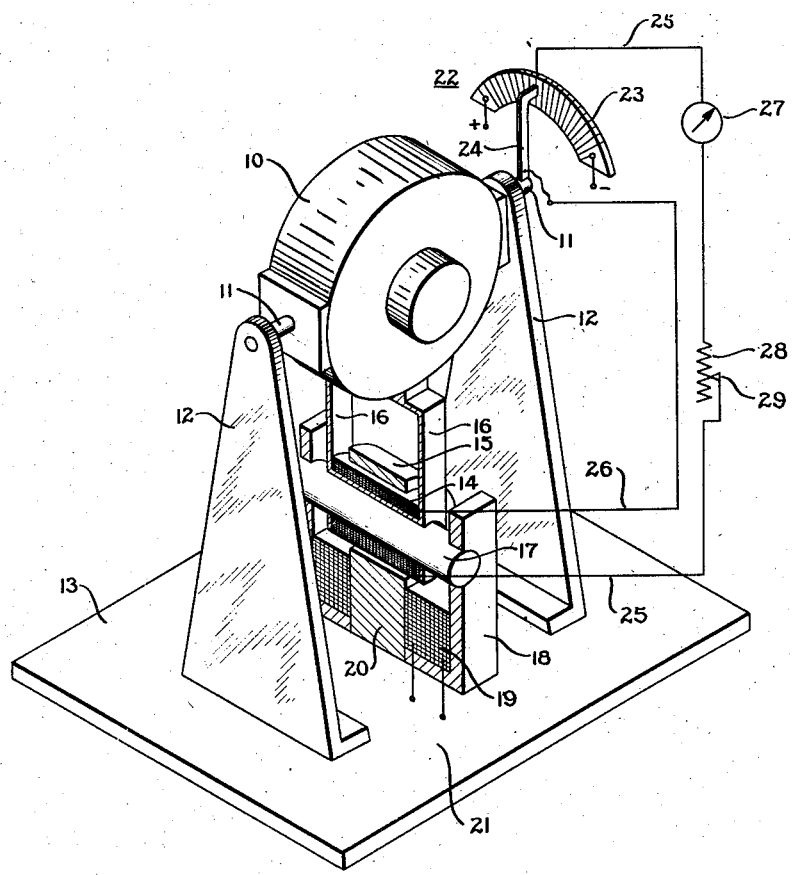
INVENTOR
Franz Fischer
BY Stephen Censtvik
ATTORNEY Patented Feb. 24, 1942

2,274,443

UNITED STATES PATENT OFFICE 2,274,443

RATE OF TURN GYROSCOPE

Franz Fischer, Berlin-Wilmersdorf, Germany, assignor to Siemens Apparate und Maschinen Gesellschaft mit beschränkter Haftung, Berlin, Germany, a corporation of Germany Application July 1, 1939, Serial No. 282,571
In Germany July 2, 1938

13 Claims. (Cl. 33—204)

This invention relates to measuring means, and more particularly to gyroscopic apparatus adapted to be mounted on a vehicle such as an aircraft, said means embodying mechanism to determine the speed of turning movement of the vehicle.

Devices of the above character have heretofore been proposed, for example, as bank or turn indicators in vehicles such as aircraft, and also for the control of other apparatus which are to be regulated in accordance with the angular velocity of a predetermined movement. These devices are generally provided with means for maintaining a rotor of the gyro in a predetermined plane of rotation, the means comprising springs which engage, for example, an arm which is attached to a shaft or trunnion about which a rotor of the gyro tends to precess. When a rotor precesses under the influence of a rotary movement occurring about the axis the sensitivity thereof, the springs tend to return the rotor into a zero or initial position. The springs therefore act as a means for measuring the moment of precession of the gyro which moment corresponds to the angular velocity of the above-mentioned rotary movement. This arrangement has the disadvantage that the springs are subject to fatigue or fatigue failure after long use and consequently when in this condition are unable to provide an exact measure of the moment of precession. Furthermore, it is desirable that the moment produced by the spring increase as a linear function of the compression thereof, but in practical operation this is difficult, if not impossible to realize.

One of the objects of this invention is to provide an apparatus of the above character, the accuracy of which will not decrease after long use.

Another object of the invention is to provide a bank or turn indicator for vehicles such as aircraft which is highly dependable in operation and very accurate.

A further object is to provide an apparatus of the above character which is highly sensitive to the speed of an angular movement about an axis of sensitivity of the apparatus.

The above and further objects and novel features will more fully appear from the detailed description when the same is read in connection with the accompanying drawing. It is to be expressly understood, however, that the drawing is for purposes of illustration only and is not intended as a definition of the limits of the invention, reference for this latter purpose being had in the appended claims.

The drawing is an isometric view partly in section illustrating one embodiment of the invention.

The form of the invention illustrated in the figure comprises, by way of example, a turn or banking speed indicator for vehicles, such as aircraft, and is constituted by a gyro rotor having a suitable housing, the latter being mounted for angular movement about a predetermined axis. Means are provided for exerting a thrust or a turning moment upon the housing or upon any other part of the arrangement which is subject to a precessional movement of the gyro rotor, said means being operatively connected with a control device which is governed in response to the precessional movement of the gyro rotor in such a manner that with an increasing displacement of the control device from a predetermined position an increase occurs in the turning moment which is exerted upon the housing tending to urge the latter towards a predetermined plane.

In the drawing a gyro rotor (not shown) is mounted in a conventional manner in a housing 10 which is provided with trunnions 11, the axis of the latter being perpendicular to the axis of the rotation of the rotor. Suitable shoulders 12 are provided for supporting said trunnions, the shoulders being mounted upon an angularly movable platform 13, i. e., a vehicle such as an airplane, the angular speed of which is to be measured. The axis of sensitivity of this arrangement thus is the axis of rotation of the platform 13, and is disposed vertically as viewed in the figure.

Means are provided for exerting a turning moment or a thrust upon the gyro housing, which means is actuated in a manner to later appear, when the gyro rotor moves from a predetermined position, comprising a solenoid arrangement which is constituted by a cylindrical coil 14 mounted in a suitable support 15, the latter being operatively associated with the housing 10 by means of struts 16. A core 17 for the solenoid is provided which is mounted preferably upon a U-shaped frame member 18, the latter being secured to the member 13. Coil 14 is adapted for longitudinal movement relative to core 17, the diameter of the latter, in the form shown, being less than the inner diameter of coil 14. Centrally disposed, preferably within the U-shaped frame member 18 beneath core 17 and beneath the coil 14 when the latter is in an initial position, is a constantly excited coil 19 having a core 20 the coil being connected to a suitable source of electric energy, for example, to direct current source 21.

The axis of rotation of the gyro rotor is horizontal in the central or zero position thereof mounting means about said second axis whereby a magnetic field is created about said electrical means coacting with the magnetic field of said continuously energized means whereby said mounting means is restored about said second axis to said normal position, and means for indicating the current flow to said electrical means during angular movement of said mounting means as a function of the rate of turn of said craft.

2. A rate of turn indicator for aircraft, comprising a gyro rotor mounted for spinning about a first axis, means mounting said rotor for angular movement about a second axis perpendicular to said spin axis, said last-named means being mounted for movement with said craft about said second axis during turning of said craft, electrical means carried by said mounting means energized during angular movement of said mounting means about said second axis to restore said mounting means to a normal position, means providing a permanent magnetic field surrounding said electrical means, means having a portion thereof movable with said mounting means about said second axis for energizing said electrical means in proportion to the amount of angular movement of said mounting means about said second axis whereby a magnetic field is created by said electrical means coacting with the permanent magnetic field to produce a force acting to restore said mounting means about said second axis to said normal position, and means indicating the current flow to said electrical means during angular movement of said mounting means as a function of the rate of angular movement of said aircraft.

3. A rate of turn indicator for aircraft, comprising a gyro rotor mounted for spinning about a first axis, means mounting said rotor for angular movement about a second axis perpendicular to said spin axis, said last-named means being mounted for movement with said craft about said second axis during turning of said craft, electrical means carried by said mounting means, means adjacent said electrical means providing a magnetic field, a core carried by said magnetic field producing means and defining a path for said magnetic field, said electrical means being mounted on said core for longitudinal sliding movement thereon, an electrical circuit for said electrical means, and means including a member movable with said mounting means during angular movement thereof about said second axis for controlling current flow in said electrical circuit whereby said electrical means is energized in proportion to the angular movement of said mounting means thereby establishing a second magnetic field to traverse said core, said fields coacting in said core to actuate said electrical means for longitudinal movement on said core whereby said mounting means is restored to said normal position carrying said movable member therewith thereby de-energizing said electrical means.

4. A rate of turn indicator for aircraft, comprising a gyro rotor mounted for spinning about a first axis, means mounting said rotor for angular movement about a second axis perpendicular to said spin axis, said last-named means being fixed for movement with said craft about said second axis during turning of said craft, an electrical coil carried by said mounting means, stationary means adjacent said coil providing a magnetic field, a core mounted upon a portion of said stationary means and defining a path for said magnetic field, said coil being mounted on said core for longitudinal sliding movement thereon, an electrical circuit for energizing said coil, and a potentiometer including a contact member movable thereover during angular movement of said mounting means about said second axis for controlling current flow in said circuit whereby said coil is energized in proportion to the amount of angular movement of said mounting means thereby establishing a second magnetic field to traverse said core, said fields coacting in said core to actuate said coil for longitudinal movement on said core whereby said mounting means is restored to said normal position thereby de-energizing said coil.

5. A rate of turn indicator for an aircraft, comprising a gyro rotor mounted for spinning about a first axis, means mounting said rotor for angular movement about a second axis perpendicular to said spin axis, said last-named means being mounted for movement with said craft about said second axis during turning of said craft, magnetic field producing means including a continuously energized member, a second member automatically energized in response to angular movement of said mounting means from a normal position about said second axis in proportion to the amount of such angular movement thereby producing a variable magnetic field coacting with the magnetic field of said first member, said second member being carried by said mounting means and adapted for movement with respect to said first member in response to the interaction of said magnetic fields to restore said mounting means to said normal position, and means connected with said second member indicating the amount of energization developed during said angular movement in moving said second member to restore said mounting means to said normal position.

6. A rate of turn indicator for an aircraft, comprising a gyro rotor mounted for spinning about a first axis, means mounting said rotor for angular movement about a second axis perpendicular to said spin axis, said last-named means being mounted for movement with said craft about said second axis during turning of said craft, magnetic field producing means including a continuously energized member, a second member automatically energized in response to angular movement of said mounting means from a normal position about said second axis in proportion to the amount of such angular movement thereby producing a variable magnetic field coacting with the magnetic field of said first member, an electrical circuit connected with said second member and having current flow therethrough controlled in accordance with the angular movement of said mounting means about said second axis, said second member being connected with said mounting means and adapted for movement with respect to said first member in response to the interaction of said magnetic fields to restore said mounting means to said normal position, and means connected in said electrical circuit for indicating the amount of current flowing to said second member whereby said mounting means is restored to said normal position.

7. A rate of turn indicator for an aircraft, comprising a gyro rotor mounted for spinning about a first axis, means mounting said rotor for angular movement about a second axis perpendicular to said spin axis, said last-named means being mounted for precession about said second axis during turning of said craft, magnetic field producing means including a continuously energized member and a second member energized during angular movement of said mounting means from a normal position about said second axis in proportion to the amount of such angular movement thereby producing a variable magnetic field coacting with the magnetic field of said first member, an electrical circuit connected with said second member, a potentiometer device connected in said circuit and having a portion thereof movable with said mounting means during angular movement thereof about said second axis for controlling current flow in said circuit to said second member in proportion to the amount of angular movement of said mounting means about said second axis, said second member being connected with said mounting means and adapted for movement with respect to said continuously energized member in response to the interaction of said magnetic fields to restore said mounting means to said normal position, and means connected in said circuit for indicating the amount of current flowing to said second member whereby said mounting means is restored to said normal position.

8. In a rate of turn responsive device for aircraft, a support adapted to be fixed on the craft, a gyroscope having a rotor mounted on said support for rotation about one axis and for precession about a second axis perpendicular to said first axis in response to a turn of the craft about a third axis mutually perpendicular to said first two axes, electromagnetic centralizing means for opposing the precession of said gyroscope whereby the amount of precession of said gyroscope is a function of the rate of turn of said craft, said means comprising a part carried by and movable with said gyroscope and another part carried by said support, and means actuated by said gyroscope upon precession thereof for energizing said electromagnetic means and controlling the instantaneous amount of energy therein in proportion to the amount of said precession.

9. In a rate of turn responsive device for aircraft, a support adapted to be fixed on the craft, a gyroscope having a rotor mounted on said support for rotation about one axis and for precession about a second axis perpendicular to said first axis in response to a turn of the craft about a third axis mutually perpendicular to said first two axes, electromagnetic centralizing means for opposing the precession of said gyroscope whereby the amount of precession of said gyroscope is a function of the rate of turn of said craft, said means comprising a part carried by and movable with said gyroscope and another part carried by said support, means actuated by said gyroscope upon precession thereof for energizing said electromagnetic means and controlling the instantaneous amount of energy therein in proportion to the amount of said precession, and electrical energy measuring means responsive to the energization of said electromagnetic means for indicating the amount of energy therein in terms of the rate of turn of said craft about said third axis.

10. In a rate of turn responsive device for aircraft, a support adapted to be fixed on the craft, a gyroscope having a rotor mounted on such support for rotation about one axis and for precession about a second axis perpendicular to said first axis in response to a turn of the craft about a third axis mutually perpendicular to said first and second axes, an electromagnetic centralizing means opposing the precession of said gyroscope without the use of any other means, whereby the amount of precession of said gyroscope is a function of the rate of turn of said craft, and means actuated by said gyroscope upon precession thereof for energizing said electromagnetic means and controlling the instantaneous amount of energy therein in proportion to the amount of said precession.

11. In a rate of turn responsive device for aircraft, a support adapted to be fixed on the craft, a gyroscope having a rotor mounted on such support for rotation about one axis and for precession about a second axis perpendicular to said first axis in response to a turn of the craft about a third axis mutually perpendicular to said first and second axes, an electromagnetic centralizing means opposing the precession of said gyroscope without the use of any other means, whereby the amount of precession of said gyroscope is a function of the rate of turn of said craft, means actuated by said gyroscope upon precession thereof for energizing said electromagnetic means and controlling the instantaneous amount of energy therein in proportion to the amount of said precession, and electrical energy measuring means responsive to the energization of said electromagnetic means for indicating the amount of energy therein in terms of the rate of turn of said craft about said third axis.

12. In a rate of turn responsive device for aircraft, a support adapted to be fixed on the craft, a gyroscope having a rotor mounted on said support for rotation about one axis and for precession about a second axis in response to the turn of said craft about a thirds axis mutually perpendicular to said first and second axes, means operated by external energy for opposing the precession of said gyroscope in either direction about said second axis without the use of any other means, whereby the amount of precession is a function of the rate of turn of said craft, and means actuated by said gyroscopes for controlling the energization of said opposing means and the instantaneous amount of energy therein in proportion to the amount of precession of said gyroscope.

13. In a rate of turn responsive device for aircraft, a support adapted to be fixed on the craft, a gyroscope having a rotor mounted on said support for rotation about one axis and for precession about a second axis in response to the turn of said craft about a third axis mutually perpendicular to said first and second axes, means operated by external energy for opposing the precession of said gyroscope in either direction about said second axis without the use of any other means, whereby the amount of precession is a function of the rate of turn of said craft, means actuated by said gyroscopes for controlling the energization of said opposing means and the instantaneous amount of energy therein in proportion to the amount of precession of said gyroscope, and means for measuring and indicating in terms of the rate of turn of said craft the amount of energy supplied to said opposing means.

FRANZ FISCHER.